(12) United States Patent
Xu (10) Patent No.: US 10,106,022 B2
(45) Date of Patent: Oct. 23, 2018

(54) TRUCK COVER SYSTEM

(71) Applicant: Cixi City Liyuan Auto Parts Co., Ltd., Cixi (CN)

(72) Inventor: Enli Xu, Cixi (CN)

(73) Assignee: Cixi City Liyuan Auto Parts Co., Ltd., Cixi (CN)

( * ) Notice: Subject to any disclaimer, the term of this patent is extended or adjusted under 35 U.S.C. 154(b) by 34 days.

(21) Appl. No.: 15/431,789

(22) Filed: Feb. 14, 2017

(65) Prior Publication Data

US 2018/0111459 A1  Apr. 26, 2018

(30) Foreign Application Priority Data

Oct. 21, 2016 (CN) .......................... 2016 1 0921654

(51) Int. Cl.
| | |
|---|---|
| *B60J 7/06* | (2006.01) |
| *B60J 7/10* | (2006.01) |
| *B60J 10/90* | (2016.01) |
| *F16B 2/00* | (2006.01) |
| *F16B 2/06* | (2006.01) |
| *B60J 7/185* | (2006.01) |
| *F16B 43/00* | (2006.01) |

(52) U.S. Cl.
CPC ............. *B60J 7/104* (2013.01); *B60J 7/1858* (2013.01); *B60J 10/90* (2016.02); *F16B 2/005* (2013.01); *F16B 2/065* (2013.01); *F16B 43/004* (2013.01)

(58) Field of Classification Search
CPC ...... B60J 7/14; B60J 7/02; B60J 7/104; F16B 2/065

USPC .................................................... 296/100.16
See application file for complete search history.

(56) References Cited

U.S. PATENT DOCUMENTS

| | | | | |
|---|---|---|---|---|
| 5,632,522 A * | 5/1997 | Gaitan | .................. | B60J 7/1621 296/100.06 |
| 5,860,691 A * | 1/1999 | Thomsen | ................... | B60J 7/08 296/100.18 |
| 6,076,881 A * | 6/2000 | Tucker | ..................... | B60J 7/141 296/100.07 |
| 6,520,559 B1 * | 2/2003 | Steffens | ................... | B60J 7/141 296/100.02 |
| 6,547,311 B1 * | 4/2003 | Derecktor | ............. | B60P 7/0815 248/229.13 |
| 7,419,207 B2 * | 9/2008 | Klein | ..................... | B60J 7/1621 296/100.06 |
| 7,452,024 B2 * | 11/2008 | Landrith | .................. | B60J 7/041 296/100.04 |

(Continued)

*Primary Examiner* — Pinel E Romain
(74) *Attorney, Agent, or Firm* — Kilpatrick Townsend & Stockton, LLP (57) ABSTRACT

A truck cover system with a rail defining a cover slot that couples to a cover that extends over a bed of a truck. A clamp system couples the rail to a truck wall. The clamp system includes a first clamp frame that couples to the truck wall, and the first clamp frame includes first and second ends with respective first and second sets of teeth. The first set of teeth engages rail teeth on the rail, and a second clamp frame couples to the rail and to the first clamp frame to secure the rail to the truck. The second clamp frame includes third and fourth ends with respective third and fourth sets of teeth. The third set of teeth couples to the truck wall and the fourth set of teeth couples to the second set of teeth of the first clamp frame.

16 Claims, 5 Drawing Sheets

(56) References Cited

U.S. PATENT DOCUMENTS 7,497,493 B1 * 3/2009 Thiessen .................. B60P 7/15
  296/3
9,827,839 B2 * 11/2017 Williamson ............. B60J 7/141

* cited by examiner

TRUCK COVER SYSTEM

FIELD OF THE INVENTION

The disclosure generally relates to a compartment cover system for trucks.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Pickup trucks are widely used vehicles that enable transportation of cargo as well as passengers. Passengers are typically housed in the truck cab while cargo can be stored in the truck bed. The truck bed is usually rectangularly shaped and open to the environment to facilitate loading and carrying of large and/or oddly shaped cargo. However, exposing the truck bed to the environment may leave the truck bed and/or cargo unprotected. For example, the truck bed and/or cargo may be exposed to dirt, precipitation (e.g., rain, snow, hail), etc. Accordingly, some truck owners purchase truck covers to protect the truck bed as well as items stored in the truck bed.

SUMMARY OF THE INVENTION

The present disclosure is directed to a truck cover system. The truck cover system includes a rail that defines a cover slot that couples to a cover that extends over a bed of a truck. A clamp system couples the rail to a truck wall and includes a first clamp frame that couples to the truck wall, and a second clamp frame that couples to the rail and to the first clamp frame to secure the rail to the truck. A latch system couples to the rail and includes a latch housing with a slot, a tongue that rests within the slot, a fastener coupled to the tongue, a bracket coupled to the latch housing and to the fastener, and a spring surrounding a portion of the fastener. The spring biases the tongue away from the bracket and into engagement with the rail. A weather seal couples to an end of the rail and forms a seal between the truck and the rail.

An aspect of the disclosure includes a truck cover system with a rail defining a cover slot that couples to a cover that extends over a bed of a truck. A clamp system couples the rail to a truck wall. The clamp system includes a first clamp frame that couples to the truck wall, and the first clamp frame includes first and second ends with respective first and second sets of teeth. The first set of teeth engages rail teeth on the rail, and a second clamp frame couples to the rail and to the first clamp frame to secure the rail to the truck. The second clamp frame includes third and fourth ends with respective third and fourth sets of teeth. The third set of teeth couples to the truck wall and the fourth set of teeth couples to the second set of teeth of the first clamp frame.

Another aspect of the disclosure includes a truck cover system with a rail defining a cover slot that couples to a cover that extends over a bed of a truck. A latch system couples to the cover and to the rail. The latch system includes a latch housing with a slot, a tongue that rests within the slot, a fastener coupled to the tongue, a bracket coupled to the latch housing and to the fastener, and a spring surrounding a portion of the fastener. The spring biases the tongue away from the bracket and into engagement with the rail, and a weather seal couples to an end of the rail. The weather seal forms a seal between the truck and the rail.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments discussed below include a truck cover system with a clamp system. The clamp system includes first and second clamp frames that enable coupling of the truck cover system to trucks with differently sized wall overhangs. For example, the first and second clamp frames may have teeth at respective ends that enable misalignment of the clamp frames so that one clamp frame may be axially offset from the other. The truck cover system, may also include a weather seal that enhances sealing with the truck. For example, the weather seal may include sealing fins of different lengths that engage a surface of the truck. In addition, the truck cover system may include a rail with indicia (e.g., symbols, numbers, or a combination thereof) that facilitate alignment of latch systems for tensioning the cover. In other words, the indicia may facilitate parallel alignment of the latch systems.

Figure 1:
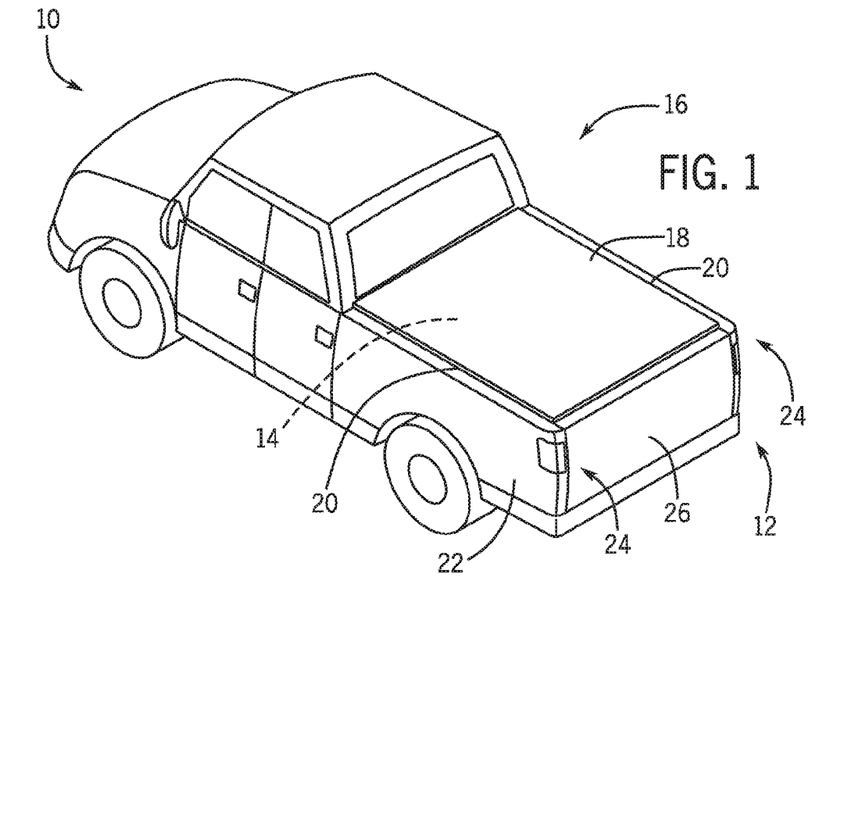
FIG. 1 is a perspective view of an embodiment of a truck with a truck cover system.

FIG. 1 is a perspective view of an embodiment of a truck 10 with a truck cover system 12. As illustrated, the cover system 12 covers the compartment 14 formed by the truck bed 16 to protect an interior of the truck bed 16 and items that may be stored in the compartment 14. For example, the cover system 12 may block dirt and precipitation from entering the truck bed 16. The cover system 12 includes a cover 18 (e.g., soft cover) that extends over the compartment 14. The cover 18 may be made out of a variety of materials including fabric, plastic (e.g., vinyl), etc. The cover 18 couples to the truck bed 16 with rails 20 that in turn couple to truck walls 22 (e.g., truck bed walls). To block removal of the cover 18 and/or access to the truck bed 16, the cover system 12 includes one or more latch systems 24. For example, the cover system 12 may include two latch systems 24 one at each corner of the truck bed 16 next to the tailgate 26. In operation, the latch systems 24 couple to the rails 20 to tension/pull the cover 18 into an extended position (e.g., taught position) that facilitates the flow of precipitation off of the cover system 12 as well as enhancing the aesthetic appearance of the cover system 12.

Figure 2:
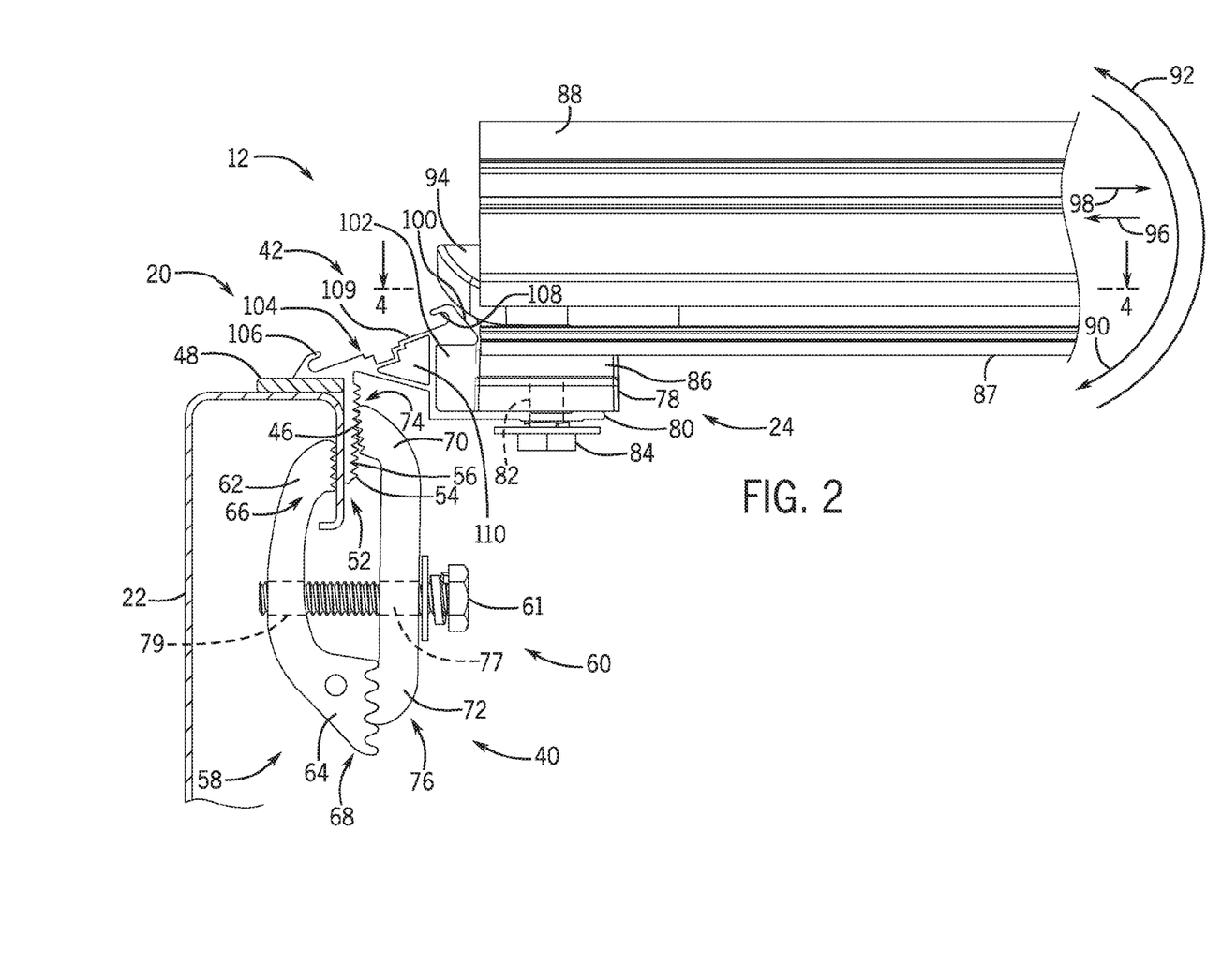
FIG. 2 is a partial front view of an embodiment of a truck cover system coupled to a truck wall with a latch system in an unlatched position.

FIG. 2 is a partial front view of an embodiment of a truck cover system 12 coupled to a truck wall 22 with a latch system 24 in an unlatched position. The cover 18 is not shown in FIG. 2. The cover system 12 includes a clamp system 40 that couples the rail 20 to the truck wall 22 and a latch system 24 that blocks removal of the cover 18 and access to the compartment 14. As illustrated, the rail 20 has a body 42 that includes a first wall 44 and a second wall 46. The first and second walls 44, 46 couple to the truck wall 22 at two different positions that may be perpendicular or substantially perpendicular to each other. In some embodiments, a weather seal 48 (e.g., rubber, plastic) may rest between the first wall 44 and the truck wall 22 to block precipitation, dirt, etc. from entering the compartment 14 (see FIG. 1). In another embodiment, the weather seal 48 may rest between both the first and second walls 44, 46 and the truck wall 22, or separate weather seals 48 may rest between the first wall 44 and the truck wall 22, and between the second wall 46 and the truck wall 22. In addition to blocking precipitation, the weather seal(s) 48 may double as a cushion that protects a surface 50 of the truck wall 22 (e.g., protect the paint job).

As illustrated, the second wall 46 includes rail teeth 52 that define a series of protrusions 54 and recesses 56. The rail teeth 52 enable attachment of the rail 20 to the truck wall 22 with the clamp system 40. The clamp system 40 includes a first clamp frame 58 and a second clamp frame 60 that couple together with a fastener 61 (e.g., bolt, screw). In some embodiments, the frames 58, 60 may be C-shaped. In operation, the fastener 61 compresses the first and second clamp frames 58, 60 together to compressively couple the rail 20 to the truck wall 22. The first clamp frame 58 includes first and second ends 62, 64 that include respective first and second sets of teeth 66 and 68. The second clamp frame 60 likewise defines first and second ends 70 and 72 with respective third and fourth sets of teeth 74, 76. By including two sets of teeth on each of the clamp frames 58, 60, the clamp frames 58, 60 can be offset from one another to accommodate different truck walls 22.

The first set of teeth 66 on the first clamp frame 58 couples to the truck wall 22 and the third set of teeth 74 on the second clamp frame 60 couple to the rail teeth 52, and the second set of teeth 68 on the first clamp frame 58 couple to the fourth set of teeth 76 on the second clamp frame 60. Accordingly, as the fastener 61 threads through aperture 77 in the second clamp frame 60 and through aperture 79 in the first clamp frame 58, the first and second clamp frames 58, 60 compress together and secure the rail 20 to the truck wall 22. In some embodiments, the first and third sets of teeth 70, 74 are sized differently than the second and fourth sets of teeth 72, 76, which may facilitate orientation and coupling of the clamp frames 58, 60 during installation. In some embodiments, the first and third sets of teeth 70, 74 are the same size as the second and fourth sets of teeth 72, 76. Furthermore, the size of the third set of teeth 74 corresponds to the size of the rail teeth 52 to enable coupling between the rail 20 and the clamp system 40.

As explained above, the cover system 12 includes a latch system 24 that couples to the rails 20. In order to couple the latch system 24 to the rail 20, the cover system 12 includes a latch positioner 78 that couples to a ledge or wall 80 that extends from the rail body 42. The ledge 80 may include apertures 82 that receive fasteners 84 that secure the latch positioner 78 to the rail 20.

The latch positioner 78 defines a curved slot 86 that receives a curved end 87 of the latch housing 88. In operation, the latch system 24 couples to the rail 20 by inserting and rotating the curved end 87 of the latch housing 88 in the curved slot 86 of the latch positioner 78 in direction 90. To uncouple the latch housing 88 from the rail 20 the curved end 87 is rotated in direction 92. The latch system 24 also includes a tongue 94 that couples to the rail 20. As will be explained in more detail below, the tongue 94 moves axially in and out of the latch housing 88 in axial directions 96 and 98 to engage and disengage from the rail 20. For example, as the latch housing 88 rotates in direction 90 the tongue 94 contacts the surface 100 (e.g., tapered, slanted, angled, curved surface) on the rail body 42. The surface 100 drives the tongue 94 in axial direction 98 and into the latch housing 88. Once the latch housing 88 rotates past the surface 100, the tongue 94 extends out of the latch housing 88 in axial direction 96 and into the tongue slot 102. In this position, the tongue 94 couples/secures the latch system 24 to the rail 20.

While the cover 18 is not shown in FIG. 2, the latch system 24 facilitates pulling the cover 18 into an extended/tensioned position that facilitates the flow of precipitation off the cover system 12 as well as enhancing the aesthetic appearance of the cover system 12. The cover 18 couples to the rail 20 by sliding an end of the cover 18 into the cover slot 104. The cover slot 104 is formed by the rail 20 with first and second curved portions 106, 108 (e.g., hooks) on opposite sides of a recess 109. In some embodiments, the rail body 42 may define an aperture 110 that enables attachment of additional components. For example, and as will be discussed below, the aperture 110 may enable attachment of a weather seal that increases the weather resistance of the cover system 12.

Figure 3:
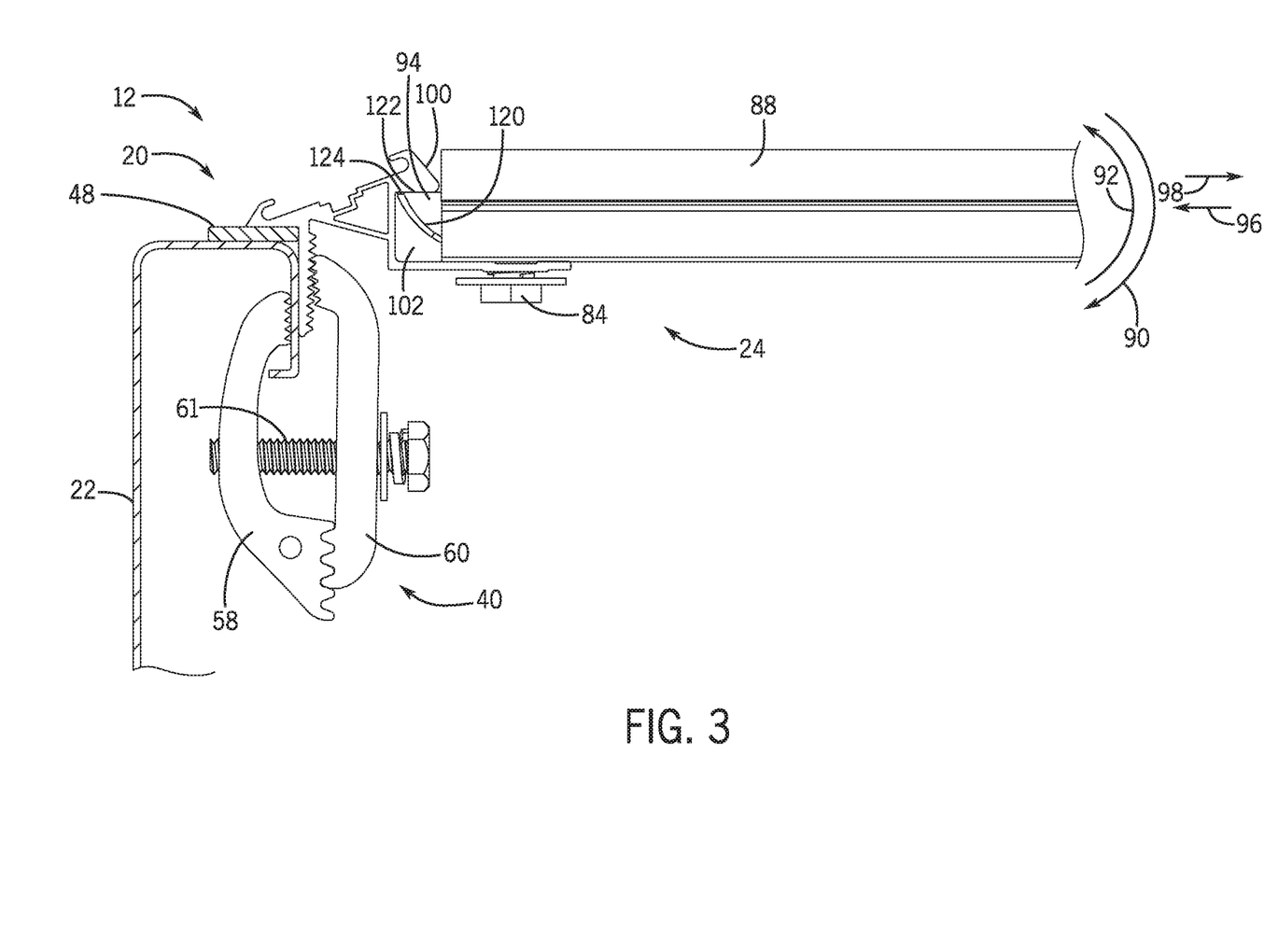
FIG. 3 is a partial front view of an embodiment of a truck cover system coupled to a truck wall with a latch system in a latched position.

FIG. 3 is a partial front view of an embodiment of a truck cover system 12 coupled to a truck wall 22 with the latch system 24 in a latched position. As explained above, the tongue 94 moves axially in and out of the latch housing 88 in axial directions 96 and 98 to engage and release from the rail 20. As the latch housing 88 rotates in direction 90, a surface 120 (e.g., slanted, angled, tapered, curved surface) of the tongue 94 contacts the surface 100 on the rail body 42. The surface 100 drives the tongue 94 in axial direction 98 and into the latch housing 88. Once the latch housing 88 rotates past the surface 100, the tongue 94 is biased out of the latch housing 88 in axial direction 96 and into the tongue slot 102 to lock the latch system 24 in place. In this position, a surface 122 (e.g., flat surface) on the tongue 94 contacts a latch retention surface 124 on the rail 20. The purpose of the latch retention surface 124 is to block rotation of the latch housing 88 in direction 92 once the tongue 94 engages the tongue slot 102. Accordingly, without user intervention to disengage the tongue 94 from the tongue slot 102, the latch system 24 remains in the latched position.

Figure 4:
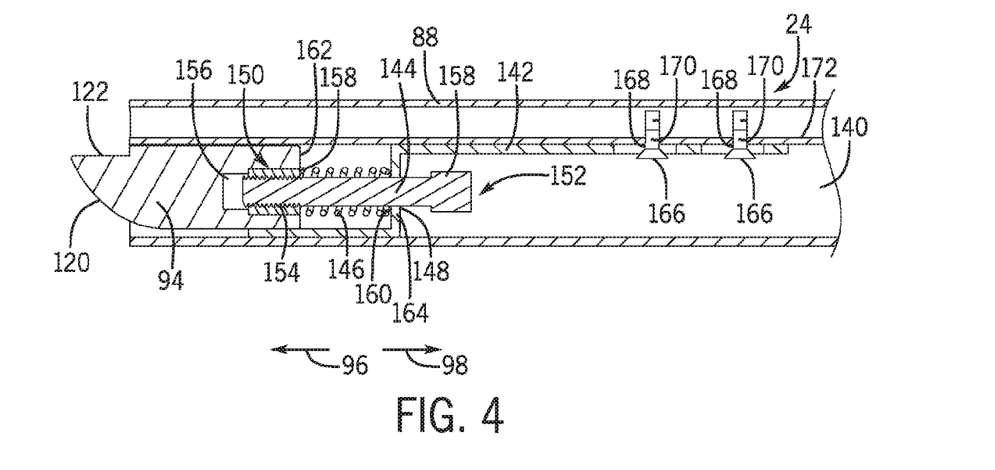
FIG. 4 is a cross-sectional view of an embodiment of a latch system along line 4-4 of FIG. 2.

FIG. 4 is a cross-sectional view of an embodiment of a latch system 24 along line 4-4 of FIG. 2. The latch housing 88 includes an aperture or slot 140 that receives the tongue 94 and a bracket 142. As illustrated, the bracket 142 couples to a fastener 144 and a spring 146 to block removal of the tongue 94 from the latch housing 88. The bracket 142 defines an aperture 148 that receives and enables the fastener 144 to move axially in directions 96 and 98. The fastener 144 includes a first end 150 and a second end 152. The first end 150 defines a threaded portion 154 that threadingly couples to an aperture 156 inside of the tongue 94. The second end 152 of the fastener 144 defines an enlarged head portion 157 that is larger than the diameter of the aperture 148 to block removal of the fastener 144 from the latch housing 88 in axial direction 96. In some embodiments, the aperture 156 in the tongue 94 may receive a threaded bushing 159 that is welded, glued, press-fit, bayonet attached, or otherwise coupled to the tongue 94. Accordingly, instead of coupling to the tongue 94, the fastener 144 threadingly couples to the threaded bushing 159.

Surrounding the fastener 144 between the first end 150 and the second end 152 is the spring 146 (e.g., helical spring). The spring 146 defines a first end 158 and a second end 160 with the first end 158 contacting a rear face 162 of the tongue 94 and the second end 160 contacting a face 164 of the bracket 142. In operation, the spring 146 biases the tongue 94 away from the from bracket 142 in axial direction 96. However, when a force greater than the spring force of the spring 146 contacts the tongue 94, the spring 146 compresses between the tongue 94 and the bracket 142. As the spring 146 compresses, the fastener 144 slides in axial direction 98 through the aperture 148, which enables the tongue 94 to move in axial direction 98. Once the force is removed, the spring 146 biases the tongue 94 again in axial direction 96 and away from the bracket 142, so that a portion of the tongue 94 extends out of the latch housing 88.

In some embodiments, the bracket 142 is an integral part of the latch housing 88 (i.e., one-piece). In another embodiment, the bracket 142 is separately coupled to the latch housing 88. For example, the bracket 142 may couple to the latch housing 88 with one or more fasteners 166 (e.g., screws, bolts) that extend through apertures 168 in the bracket 142 and apertures 170 in a wall 172 of the latch housing 88.

Figure 5:
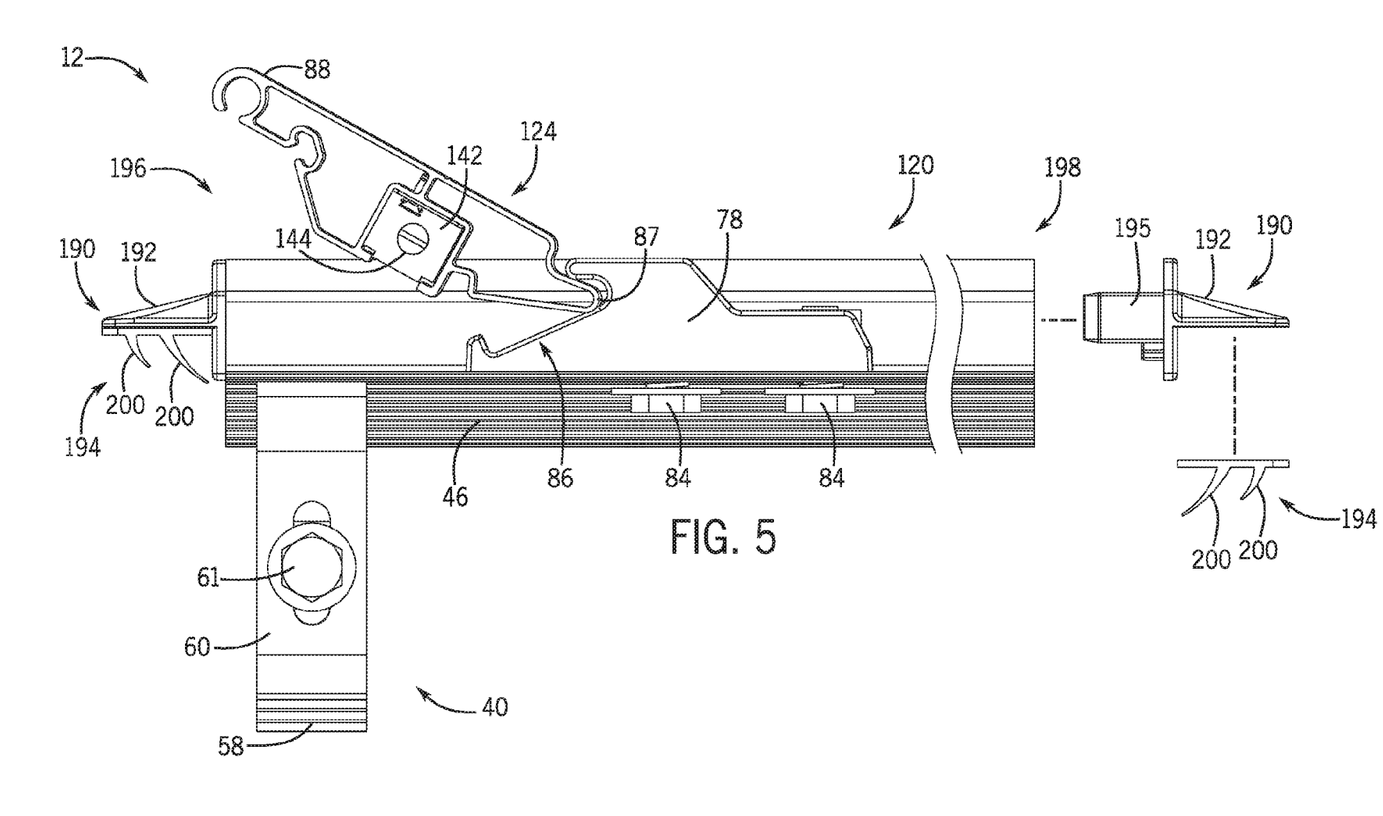
FIG. 5 is a partial side view of an embodiment of a truck cover system with a latch system in an unlatched position.

FIG. 5 is a partial side view of an embodiment of a truck cover system 12 with the latch system 24 in an unlatched position. As explained above, the cover system 12 may include a weather seal 190. In operation, the weather seals 190 forms a seal between the rail 20 and an end of the truck wall 22. The weather seal 190 may include an attachment portion 192 and a seal portion 194. The attachment portion 192 couples to the rail 20 and supports the seal portion 194. For example, the attachment portion 192 includes a protrusion 195 that couples to the rail 20 in the apertures 110 (see FIG. 2 and FIG. 6) at either a first end 196 and/or a second end 198 of the rail 20. For example, the protrusion 195 may be snap fit, press fit, etc. to the rail 20.

The seal portion 194 may be made out of flexible material (e.g., plastic, rubber) that is forms a seal as it deforms against another surface (e.g., truck wall 22). In some embodiments, the seal portion 194 includes one or more sealing fins 200 (e.g., 1, 2, 3, 4, 5). The sealing fins 200 may be axially spaced apart with respect to the axis of the rail 20. In some embodiments, the sealing fins 200 may be different sizes. For example, one sealing fin 200 may be longer and/or wider than another sealing fin 200. In some embodiments, the sealing fins 200 may be curved and curve in a specific direction (e.g., curve towards the rail 20). Finally, in some embodiments, the seal portion 194 may be a separate piece that couples to the attachment portion 192 (e.g., adhesives, snap fit). In another embodiment, the attachment portion 192 and the seal portion 194 may be integral/one-piece.

Figure 6:
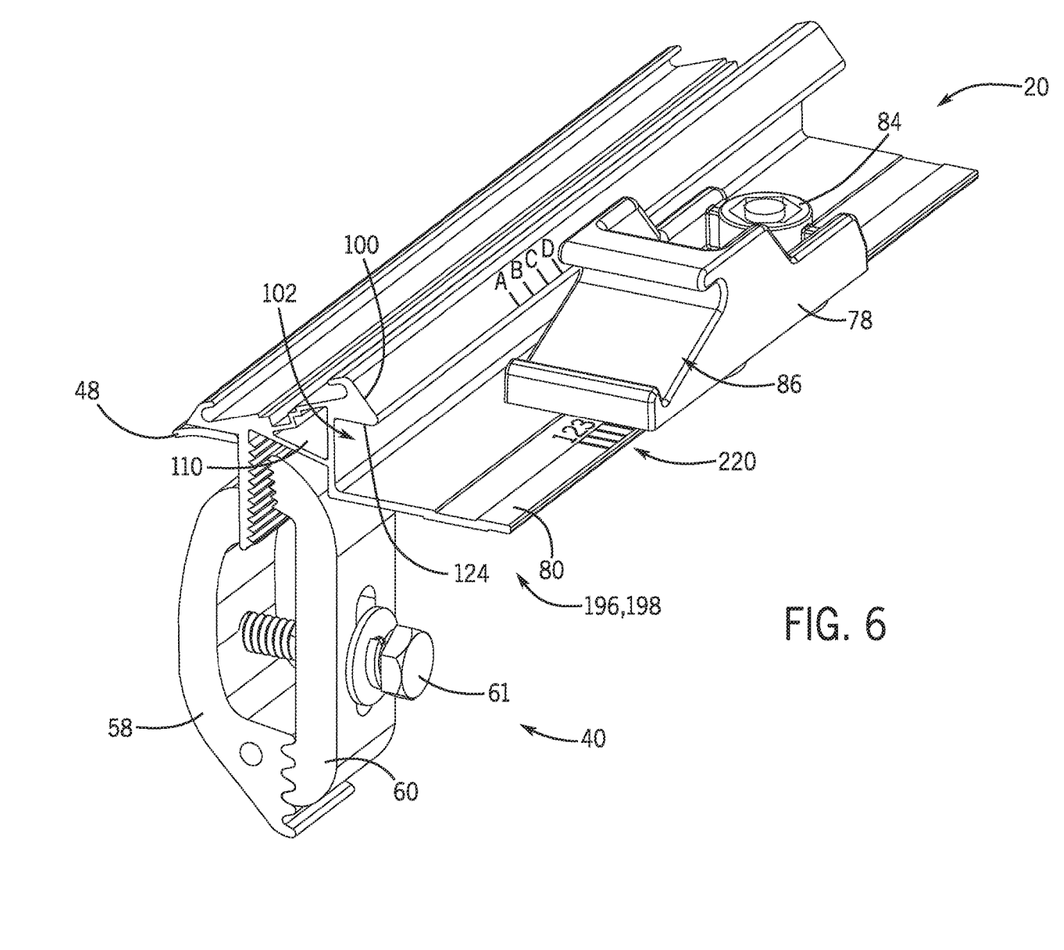
FIG. 6 is a partial perspective view of an embodiment of the truck cover system without the latch system.

FIG. 6 is a partial perspective view of an embodiment of the truck cover system 12 without the latch system 24. As discussed above, the cover system 12 may include two latch systems 24 one for each rail 20. In order to properly tension the cover 18, the latch systems 24 should align with one another (e.g., be parallel). Accordingly, the rail 20 includes indicia 220 (e.g., measurement, alignment indicia) that enable a user to easily determine the position of the latch positioner 78 with respect to an end 196, 198 of the rail 20. The indicia 220 may be a symbol such as lines and/or other shapes (e.g., circles, triangles, squares). In some embodiments, the indicia 220 may be words and/or numbers. For example, numbers may represent measurements (e.g., inches, mm) from an end 196, 198 or a simple number (e.g., 1, 2, 3) that indicates a position with respect to the rail 20. In some embodiments, the indicia 220 may be a combination of shapes, words, and numbers or a subset thereof. In operation, a user can easily determine the position of each latch positioner 78 by referring to the indicia 220, thus avoiding the need to separately measure each latch positioner 78 in order to align the latch systems 24. The indicia 220 may be located on the wall 80 and/or positioned at another location. For example, the indicia 220 may be on the surface 100 of the rail body 42.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A truck cover system, comprising:
   a rail defining a cover slot configured to couple to a cover that extends over a truck bed;
   a clamp system configured to couple the rail to a truck wall, the clamp system, comprising:
   a first clamp frame configured to couple to the truck wall, wherein first clamp frame comprises first and second ends with respective first and second sets of teeth, and wherein the first set of teeth is configured to engage rail teeth on the rail;
   a second clamp frame configured to couple to the rail and to the first clamp frame to secure the rail to the truck;
   a latch system configured to couple to the rail, the latch system, comprising:
   a latch housing comprising a slot;
   a tongue configured to rest within the slot;
   a fastener coupled to the tongue and configured to rest within the slot;
   a bracket coupled to the latch housing and to the fastener;
   a spring surrounding a portion of the fastener, wherein the spring biases the tongue away from the bracket and into engagement with the rail; and
   a weather seal coupled to an end of the rail, wherein the weather seal forms a seal between the truck and the rail.

2. The system of claim 1, wherein the weather seal comprises a protrusion that couples to an aperture on the rail.

3. The system of claim 2, wherein the weather seal comprises a sealing portion with a first curved fin.

4. The system of claim 3, wherein the sealing portion comprises a second curved fin, and wherein the first curved fin is smaller than the second curved fin.

5. The system of claim 1, wherein the first and second clamp frames are C-shaped.

6. The system of claim 1, comprising a latch positioner configured to couple to the rail and to the latch housing to enable rotation of the latch housing and tensioning of the cover.

7. The system of claim 6, wherein the rail comprises indicia configured to align the latch positioner to facilitate tensioning of the cover.

8. The system of claim 1, wherein the first set of teeth and the second set of teeth are different sizes.

9. The system of claim 1, wherein the second clamp frame comprises third and fourth ends with respective third and fourth sets of teeth, and wherein the third set of teeth is configured to couple to the truck wall.

10. The system of claim 9, wherein the third set of teeth and the fourth set of teeth are different sizes.

11. A truck cover system, comprising:
a rail defining a cover slot configured to couple to a cover that extends over a truck bed;
a clamp system configured to couple the rail to a truck wall, the clamp system, comprising:
a first clamp frame configured to couple to the truck wall, wherein
first clamp frame comprises first and second ends with respective first and second sets of teeth, and wherein the first set of teeth is configured to engage rail teeth on the rail; and
a second clamp frame configured to couple to the rail and to the first clamp frame to secure the rail to the truck, wherein the second clamp frame comprises third and fourth ends with respective third and fourth sets of teeth, and wherein the third set of teeth is configured to couple to the truck wall and the fourth set of teeth is configured to couple to the second set of teeth of the first clamp frame.

12. The system of claim 11, wherein the first set of teeth and the second set of teeth are different sizes.

13. The system of claim 11, wherein the third set of teeth and the fourth set of teeth are different sizes.

14. The system of claim 11, wherein the first and second clamp frames are c-shaped.

15. The system of claim 11, a latch system configured to couple to the cover and to the rail, the latch system, comprising:
a latch housing comprising a slot;
a tongue configured to rest within the slot;
a fastener coupled to the tongue and configured to rest within the slot;
a bracket coupled to the latch housing and to the fastener; and
a spring surrounding a portion of the fastener, wherein the spring biases the tongue away from the bracket and into engagement with the rail.

16. The system of claim 15, a weather seal coupled to an end of the rail, wherein the weather seal forms a seal between the truck and the rail.

* * * * *